Figure 1:
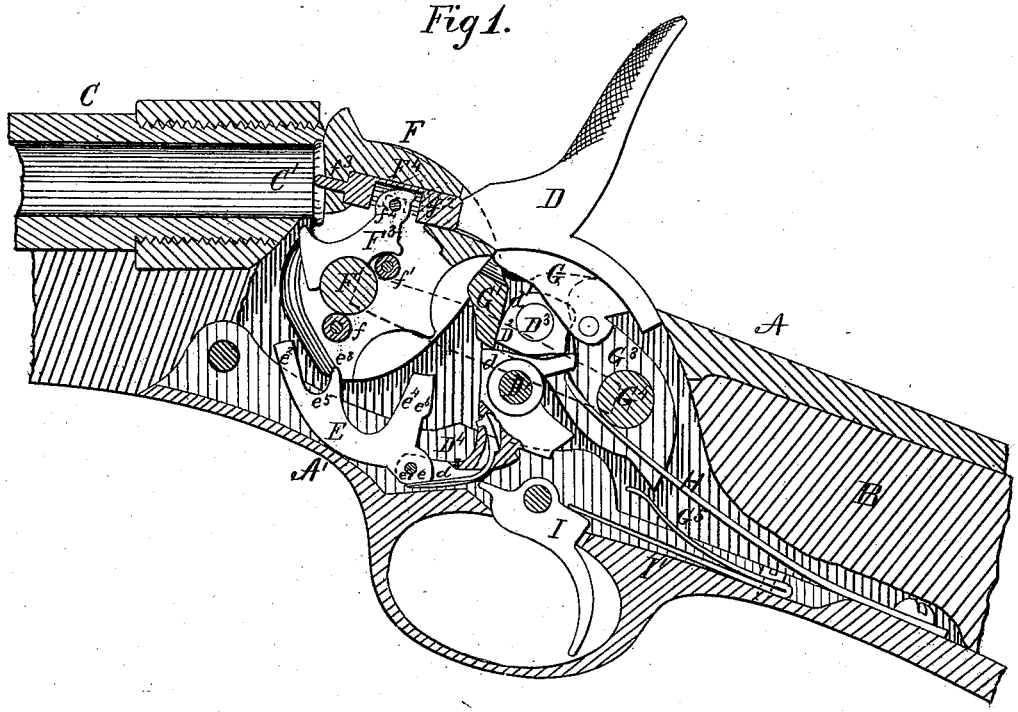

H. UPDEGRAFF.
BREECH-LOADING FIRE-ARM.

No. 189,973.  
4 Sheets—Sheet 1.  
Patented April 24, 1877.

Witnesses.  
B. C. Pole  
J. B. Holderly

Inventor:  
Horace Updegraff  
Per R. S. & A. P. Lacey  
attorneys.

4 Sheets—Sheet 2.
H. UPDEGRAFF.
BREECH-LOADING FIRE-ARM.
No. 189,973. Patented April 24, 1877.
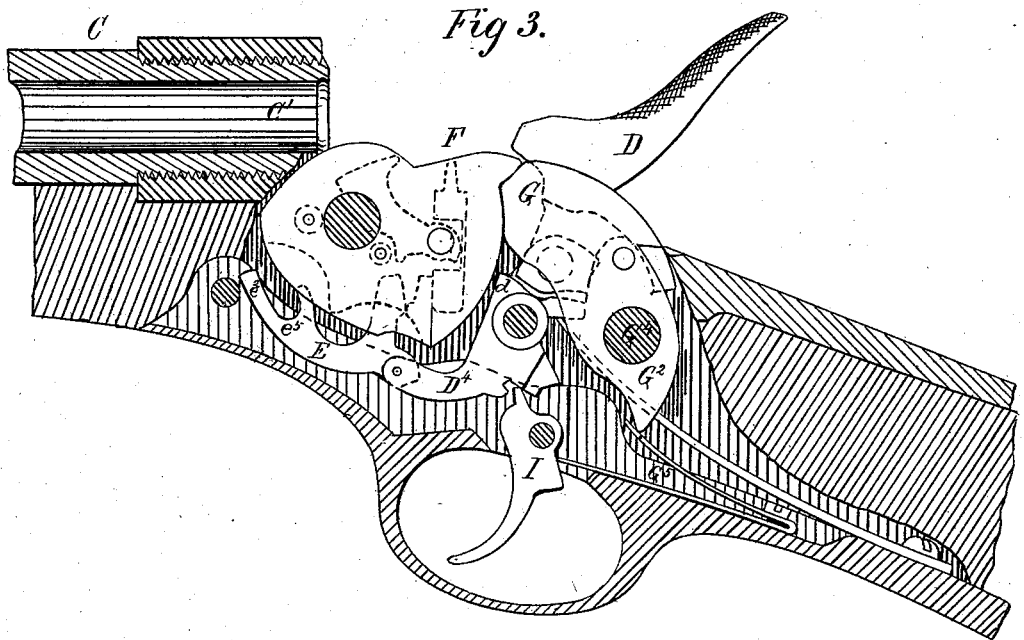
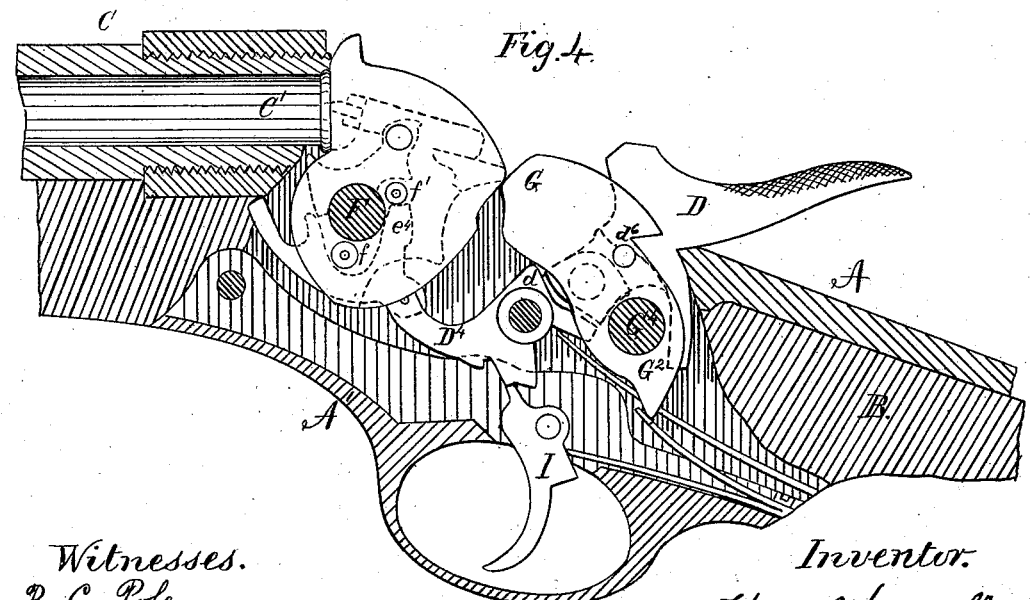
Witnesses.
B. C. Pole.
J. B. Holderly.
Inventor.
Horace Updegraff
Per R. S. & A. Lacey
attorneys.

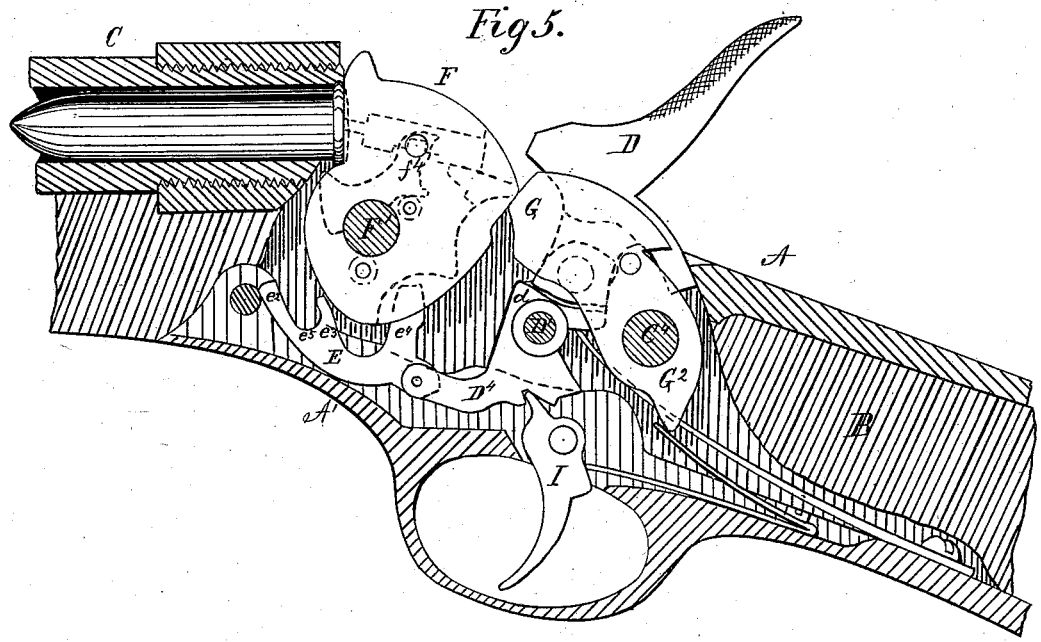
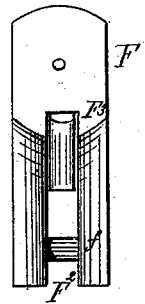
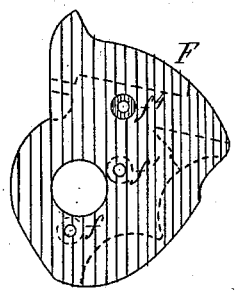
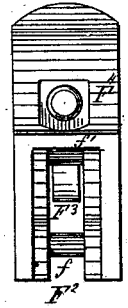
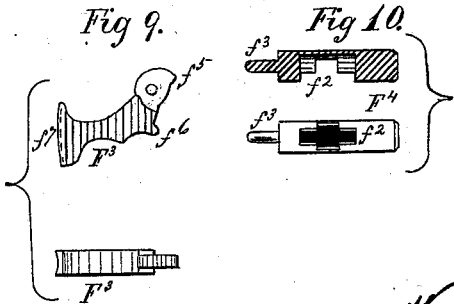

H. UPDEGRAFF.
BREECH-LOADING FIRE-ARM.
No. 189,973. Patented April 24, 1877.
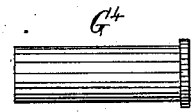
Fig. 13.
Fig. 14.
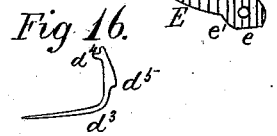
Fig. 16.
Fig. 15.
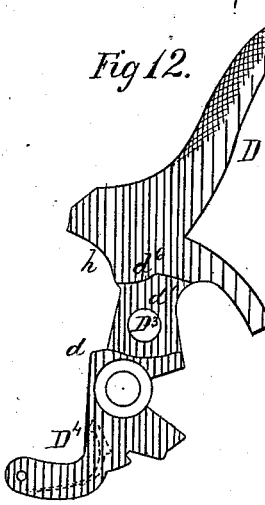
Fig. 12.
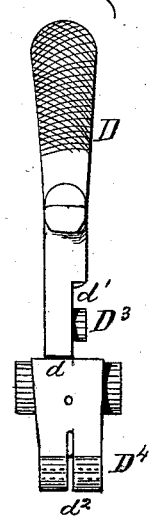
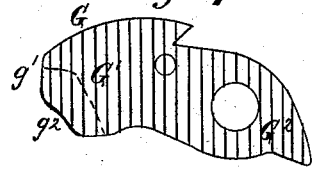
Fig. 17.
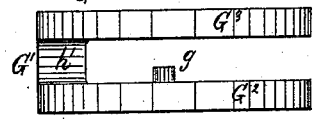
Fig. 18.
Fig. 19.
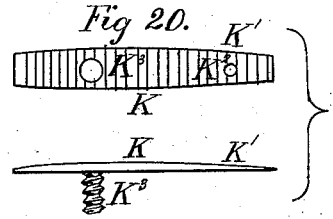
Fig. 20.
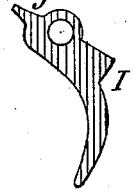
Fig. 21.
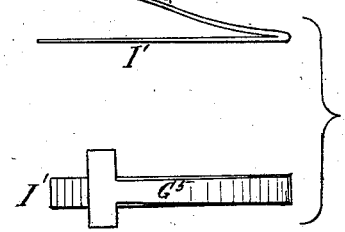
Fig. 22.
Witnesses
B. C. Pole
J. B. Holderby
Inventor
Horace Updegraff
Per R. S. & A. Lacey
attorneys

UNITED STATES PATENT OFFICE.

HORACE UPDEGRAFF, OF SMITHFIELD, OHIO.

IMPROVEMENT IN BREECH-LOADING FIRE-ARMS.

Specification forming part of Letters Patent No. 189,973, dated April 24, 1877; application filed November 18, 1876.

*To all whom it may concern:*

Be it known that I, HORACE UPDEGRAFF, of Smithfield, in the county of Jefferson and State of Ohio, have invented certain new and useful Improvements in Breech-Loading Fire-Arms; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in breech-loading fire-arms; and has for its object to provide a lock in which all the principal movements of the several parts shall be effected by positive action received directly from the hammer and its attachments.

It consists in providing the hammer with a forward-projecting shoulder and a rocking cam, arranged above the center of motion, and adapted to raise the locking-shoulder and unlock the breech-block, and with an extension below said center of motion, to which extension is hinged or pivoted a forked sear or actuating-lever, which engages with, and both opens and closes, the breech-block and operates the extractor.

It consists, further, in a locking-shoulder made in a separate piece, detached from and pivoted to the frame, in rear and above the center of motion of the hammer, with capability of a slight vertical movement of its forward end, which, in the act of locking the breech-block, moves independently of the hammer, and which is so adjusted as to remain constantly in contact with the breech-block, regulating the movement of and locking the latter at either a half or whole cock, as desired; and it consists, further, in other mechanism, all of which will be hereinafter fully explained, reference being made to the accompanying drawings, which form a part of this specification.

In the drawings, Figures 1, 2, 3, 4, and 5 are longitudinal vertical sections of a frame in which is placed my improved lock, showing the latter in the different positions taken by the several parts in their operation; and Figs. 6, 7, 8, 9, 10, 11, 12, 13, 14, 15, 16, 17, 18, 19, 20, 21, and 22 are detail views of the several parts.

A is the frame, in which are secured the several operating parts of the lock, and to which are secured the stock B and the barrel C, having the cartridge-chamber $C^1$. D is the hammer, working on the pin $D^1$, and on the shaft of which, above the pin $D^1$, is placed a rocking cam, $D^2$, working on a stud, $D^3$, standing out from the side of the hammer-shank. The lower end $D^4$ of the hammer is extended below the axis $D^1$, and has pivoted thereto, with capability of a vertical hinge movement, the forked sear or actuating-lever E.

F is the breech-block, pivoted to the frame by the pin $F^1$, and formed with a slot or chamber, $F^2$, in which are placed the extractor $F^3$, the firing-pin $F^4$, and suitable bearing-studs $f f^1$.

G is the locking-shoulder, formed with a solid head-piece, $G^1$, from which extend the rear parallel wings $G^2$ $G^3$, between which the hammer swings back and forth, and which works on a pin, $G^4$, passing through said wings, in rear and above the center of motion of the said hammer; and it is steadied by the spring $G^5$, affixed to the frame.

H is the mainspring. I is the trigger, which engages in tumblers, of ordinary construction, on the hammer D; and $I^1$ is the trigger-spring.

The hammer D, above its center of motion $D^1$, is cut away, so as to provide on its front edge the lifting-shoulder $d$, and on its side the recess $d^1$, adapted to receive and permit the free rocking movement of the cam D on its axis $D^3$, and the sliding of said cam under the pin or stud (hereinafter described) on the inner face of the wing $G^2$ of the locking-shoulder G. Its lower end $D^4$ is provided with the slot $d^2$, in which is placed the supporting-spring $d^3$, and in which is pivoted the end of the forked sear E, which is supported in an elevated or depressed position, as hereinafter described, by the spring $d^3$ pressing on the straight bearing-edges $e$ $e^1$. The spring $d^3$ is formed, as shown, with its inner end curved upward, and provided with the projection $d^4$ and shoulder $d^5$, so that it may be inserted in a suitably-formed chamber in rear of the slot $d^2$, where it is securely held without the aid of retaining-pins.

The sear E is formed with the upward-projecting arms or prongs $e^2$, $e^3$, and $e^4$, and with the bearing $e^5$, arranged and adapted to engage the breech-block F, and open or close the latter, and operate the extractor, as hereinafter explained. The arm $e^4$ is enlarged or provided with a rear shoulder, $e^6$, which, at a proper time, is brought in contact with the breech-block, and throws the sear from the elevated position on the bearing $e$ to the depressed position on the bearing $e^1$, as shown in Figs. 1 and 3.

Within the chamber $F^2$ of the breech-block are placed the bearing-studs $f f^1$, which are arranged close by (the one below, and the other above) the axial pin $F^1$. The stud $f$ engages the bearing $e^5$ and projection or arm $e^3$ on the sear E in the act of opening, and the stud $f^1$ engages the arm $e^4$ in the act of closing, the breech-block, as hereinafter explained.

The firing-pin $F^4$ is placed in a transverse mortise, which connects with the upper or inner part of the recess or chamber $F^2$. It is formed with a central mortise, $f^2$, adapted to receive the end of the extractor $F^3$, by which it is thrown back in the act of opening the breech-block, so as to bring its point $f^3$ entirely within said transverse mortise, where it remains till driven out by the hammer in the act of firing the gun. It is prevented from dropping out of the breech-block by the pin $f^4$, on which the extractor swings.

The extractor $F^3$ has formed on its inner end the projection $f^5$, which strikes against the rear end of the recess $f^2$ and throws the firing-pin back while the breech-block is being opened. It swings on the pin $f^4$, and has the rear projection $f^6$ to engage the end of the arm $e^4$, and has the elongated head $f^7$, which catches and withdraws the cartridge-shell from the chamber C. When the breech-block is closed it rests in the position shown in Fig. 1.

The locking-shoulder G is, by preference, provided with two wings, in order to secure greater strength and more exact action; but it will be readily seen that it will operate with but one wing. It is made in a separate piece, and is disconnected from the hammer. It does not swing back with, but moves vertically and separate from, the hammer. It is pivoted on the pin $G^4$, placed in rear of the center of motion of the hammer, so that it rests in the frame, when the breech-block is closed, in a nearly horizontal position, by which arrangement the center of resistance is placed nearly in a horizontal plane with, and in rear of, the point of support against the breech-block, a greater angle of resistance against the open end of the cartridge-chamber C' is provided, and the full force of the gravity of the head $G^1$ in dropping into position behind the breech block is obtained. It is lifted by the shoulder $d$ and cam $D^2$ from its position behind, so as to unlock the breech-block. It drops by its own weight into position, so as to lock the breech-block the instant the latter is closed, so that it will be readily seen that the locking of the breech-block is by a movement of the locking-shoulder acting independently of the hammer and its attachments. It rests on the shoulder $d$ when the breech-block is closed and the hammer down, as shown in Fig. 1, and by the slightest movement of the hammer in raising the latter it is raised by said shoulder $d$ sufficiently to relieve any friction caused by close contact between it and the breech-block, thus insuring perfect and rapid action of the parts. It is provided with a stud, $g$, projecting from the inner face of the wing $G^2$, so arranged that in drawing the hammer back to a half-cock the cam $D^2$ engages it and raises the locking-shoulder, so as to permit the opening of the breech-block. It is formed with the face $g^1$, which abuts against the breech-block when the latter is locked, and with the concave beveled surface $g^2$, which rests on top, and acts as a friction-stop, to prevent the breech-block from dropping open of its own weight when the locking-shoulder has been raised, as above indicated. Ordinarily the weight of the locking-shoulder is sufficient to hold the breech-block as the latter is opened; but, to insure against accident, a supporting-spring, $G^5$, is provided, which bears under the rear ends of the wings $G^2$ $G^3$, and insures perfect action in all positions in which the gun may be placed.

In the construction of the recess $d^1$ on the shank of the hammer a cam-surface, $d^6$, is formed, which is so arranged that when the hammer is drawn to a full cock it will come in contact with the pin $g$ on the wing $G^2$, and by positive action force and hold down the locking-shoulder, as shown in Fig. 1. This construction provides against any possible accident that might be caused by dust or other obstructing substances which may get in between the breech-block and head $G^1$, so as to prevent the the latter from dropping of its own weight into its locking position.

The neck of the hammer is curved at $h$, as shown, and adapted to press on the curved surface $h^1$ between the wings $G^2$ $G^3$ of the locking-shoulder, and force the latter more securely into its locking position behind the breech-block.

K is a screw with an extended spring-head, which rests on the heads of and retains the pins $D^1$, $F^1$, and $G^1$ in the frame, as indicated by dotted lines in Fig. 1. It is held in place on said pins by a stud or projection formed on the side of the frame A, and which enters the recess $K^2$, formed in the under side of the end $K^1$. Its shank $K^3$ is turned into a suitably placed and threaded hole in the frame. When it is in position on the heads of the pins $D^1$ $F^1$ $G^4$, as indicated, it may be removed by pressing on the opposite end of the pin $G^4$, which raises the recess $K^2$ clear of its retaining-stud, after which the bar may be turned off the heads of said pins. It is placed in position on said pins by a similar process.

The operation of the device is as follows: The parts being in the position shown in Fig. 1, with the nose of the hammer resting on the firing-pin, the hammer is raised or drawn back to the position shown in Fig. 2, which position is slightly past a half-cock, beyond which it cannot be drawn till after being released and permitted to drop forward, as hereinafter indicated. In the above-indicated movement of the hammer the locking-shoulder is lifted from its position behind the breech-block, the breech-block is swung open, the extractor is elevated, and the shell ejected. In the commencement of the above movement of the hammer, the shoulder $d$ raises the locking-shoulder G sufficiently to release the latter from close contact with the breech-block before any of the other parts become engaged. Immediately thereafter, the rear end of the cam $D^2$ comes in contact with the stud $g$, and elevates the locking-shoulder sufficiently to permit the top of the breech-block to pass under the curved bearing-surface $g^2$, at which instant the arm $e^2$ of the sear touches the head of the extractor, and elevates the latter sufficiently to catch behind the flange of the shell. The bearing $e^5$ now engages the pin $f$, and, aided by the arm or projection $e^3$, throws open the breech-block. Immediately after the commencement of the turning of the breech-block, the cam $D^2$ rocks back on its axis, relieves the pressure on the pin $g$, and the locking-shoulder drops, bringing the surface $g^2$ in close contact with the top of the breech-block, and steadies the movement of, and prevents the latter from dropping open of its own weight, in which event the proper action of the extractor would be prevented. When the breech-block has been turned nearly to the position shown in Fig. 2, the extractor will have drawn the shell almost clear of the chamber C', and now the arm $e^4$ comes in contact with the with the projection $f^6$ on the extractor, and elevates the latter with a quick jerking movement into the position shown in Fig. 2, by which movement the shell is tossed from the gun, and the point of the firing-pin is drawn within the breech-block. The latter part of the movement of opening the breech-block is done by the arm or projection $e^3$ engaging between the stud $f$ and the pin $F^1$, as shown.

Figure 2:
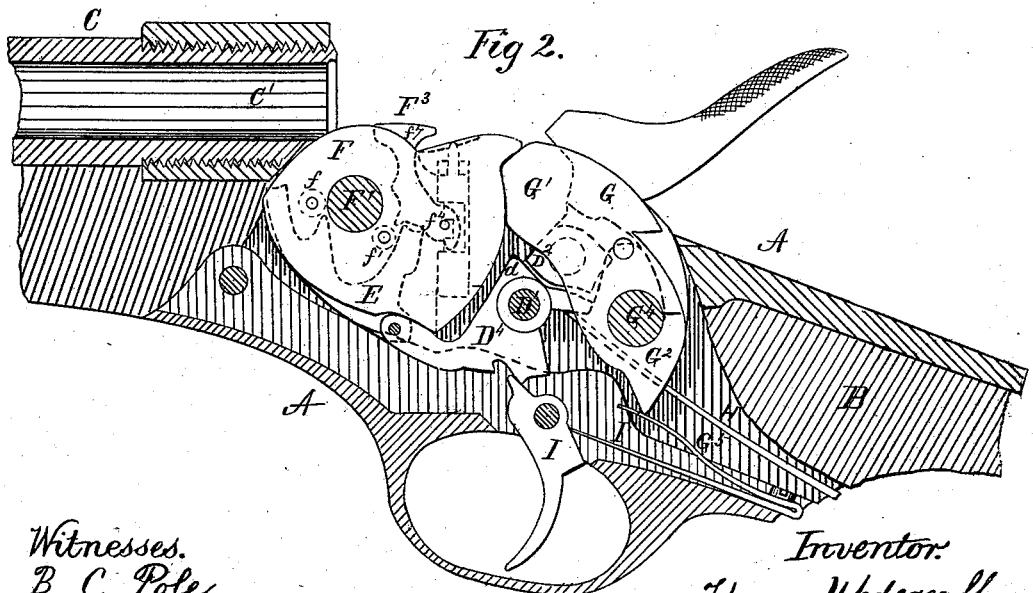

The parts of the lock will now be in the positions shown in Fig. 2, with the hammer drawn slightly past a half-cock, from which position said hammer cannot be drawn to a full cock till after it has been released and permitted to drop forward into the position shown in Fig. 3. In this slight movement of the hammer forward, the lower end $D^4$ is drawn back, and the arm $e^4$ is brought against the breech-block, and the sear is turned down to the position shown, where it is held steadily by the spring $d^3$, and the hammer is released so that it may be drawn to a full cock. The lock is now in proper position for loading the gun, and a cartridge is inserted within the chamber C'. The hammer is now drawn back to a full cock, which movement throws the sear forward, causing the arm $e^4$ to catch on the pin or stud $f^1$, and swing the breech-block forward against the breech, which being done, the locking-shoulder drops of its own weight behind and locks the breech-block, as shown in Fig. 4. From the position shown in Fig. 4 the gun may be fired, or the hammer may be let down to a half-cock, as shown in Fig. 5. If the gun be fired, or the hammer be let down with the hand so as to bring the nose against the firing-pin, as shown in Fig. 1, the backward movement of the extension $D^4$ brings the under edge of the sear against the under part of the frame at $A^1$, and thus turns the said sear up into the first position, (shown in Fig. 1,) preparatory for opening the breech-block.

The cam $D^2$, after lifting the locking-shoulder clear of the breech-block, as hereinbefore described, does not interfere in the further movements of the hammer and shoulder, but its free rocking movement on its axis permits the said locking-shoulder to act as a friction-stop to the breech-block, and to drop of its own weight into position for locking said breech-block. The position of the pin $g$ above the cam prevents the lifting or accidental displacement of the locking-shoulder from its position behind the breech-block when the lock is at a whole or half cock.

When the lock is at a half or whole cock, about one-fourth of the end $g'$ abuts against the breech-block, but when the gun is fired, the change in position of the cam $D^2$ and pin $g$ permits the shoulder to drop entirely behind the block, and the neck $h$ of the hammer strikes the rear shoulder $h'$ of the locking-shoulder, and forces the latter into firmer contact with the breech-block, so that all possibility of accident or of recoil by reason of imperfect contact is obviated.

It will be readily seen that the movements of the breech-block and locking-shoulder are all accomplished by positive action, and that the locking of said breech-block is accomplished by a movement of the locking-shoulder independent of the hammer.

Having described my invention, what I claim, and desire to secure by Letters Patent, is—

1. In a breech-loading fire-arm a gravity locking-shoulder, constructed substantially as hereinbefore described with a solid head-piece and extended wing pivoted to the frame in rear, above the center of motion, and having a vertical movement independent of the hammer, substantially as and for the purposes set forth.

2. The hammer, provided with a shoulder, $d$, adapted to lift the locking-shoulder free from the breech-block before the movement of the latter is commenced, substantially as set forth.

3. The combination, with the hammer D, of a pivoted rocking cam, $D^2$, adapted to engage and elevate the locking-shoulder G clear of the breech-block, substantially as set forth.

4. The combination with the hammer D, having the extension $D^4$, of a pivoted forked sear adapted to engage with and open and close the breech-block, and operate the extractor, substantially as set forth.

5. The combination, with the breech-block F, having the chamber $F^2$ and firing-pin $F^4$, constructed as described, of the pivoted extractor $F^3$, substantially as and for the purposes set forth.

6. The combination, with the hammer D, provided with extension $D^4$, and pivoted sear E, having the bearings $e$ $e^1$ and arm $e^4$, of the spring $d^3$, breech-block F, and bearing $A'$, on the frame A, for the purposes specified.

7. The hammer D, provided with a shoulder or cam, $d^6$, arranged and adapted to engage the stud $g$ on the locking-shoulder, for the purpose set forth.

8. The combination of the locking-shoulder G, having a solid head, $G^1$, and rear wings $G^2$ $G^3$ and stud $g$ pivoted to the frame, and the hammer D constructed with the shoulder $d$ and recess $d^1$, and the rocking cam $D^2$, arranged and operating substantially as and for the purpose set forth.

In testimony that I claim the foregoing as my own I affix my signature in presence of two witnesses.

HORACE UPDEGRAFF.

Witnesses:
GEORGE E. EMMONS,
E. A. McINTIRE.